United States Patent [19]
Albares

[11] Patent Number: 5,007,700
[45] Date of Patent: Apr. 16, 1991

[54] EDGE-EMITTING DIODE-TO-OPTICAL FIBER COUPLING TECHNIQUE

[75] Inventor: Donald J. Albares, San Diego, Calif.

[73] Assignee: The United States of America as represented by the Secretary of the Navy, Washington, D.C.

[21] Appl. No.: 509,107

[22] Filed: Apr. 13, 1990

Related U.S. Application Data

[63] Continuation-in-part of Ser. No. 318,989, Mar. 3, 1989, Pat. No. 4,930,854.

[51] Int. Cl.$^5$ .............................................. G02B 6/42
[52] U.S. Cl. ............................ 350/96.17; 350/96.20; 350/320
[58] Field of Search .................... 29/569.1; 350/96.15, 350/96.17, 96.20, 96.21, 96.22, 320

[56] References Cited

U.S. PATENT DOCUMENTS

| | | | |
|---|---|---|---|
| 3,887,997 | 6/1975 | Hartleroad et al. | 29/569.1 X |
| 3,899,235 | 8/1975 | Arnaud et al. | 350/96.15 |
| 4,097,118 | 6/1978 | Hammer | 350/96.17 |
| 4,130,343 | 12/1978 | Miller et al. | 350/96.15 |
| 4,152,044 | 5/1979 | Liu | 350/96.12 |
| 4,164,363 | 8/1979 | Hsu | 350/96.17 |
| 4,186,994 | 2/1980 | Denkin et al. | 350/96.17 |
| 4,474,429 | 10/1984 | Yoldas et al. | 350/320 |
| 4,664,732 | 5/1987 | Campbell et al. | 350/96.15 X |
| 4,744,619 | 5/1988 | Cameron | 350/96.17 |
| 4,767,174 | 8/1988 | Carenco et al. | 350/96.20 |
| 4,796,975 | 1/1989 | Lukas et al. | 350/320 |
| 4,930,854 | 6/1990 | Albares et al. | 350/96.17 |
| 4,948,219 | 8/1990 | Seino et al. | 350/96.20 |

FOREIGN PATENT DOCUMENTS 2191601 12/1987 United Kingdom ............. 350/96.20

OTHER PUBLICATIONS

Burns et al, "End Fire Coupling Between Optical Fibers and . . . ", *Appl. Optics,* 16, 2048, 1977.
Ramer, "Controlled Fiber Optic Switching", *Hughes Research Lab-AF Tech. Report AFWAL-TR-81-1002,* Dec. 1980.
Guttmann et al, "Optical Fiber-Stripline-Coupler", *Appl. Optics,* 14, 1225, 1975.
Boivin, "Thin-Film Laser-to-Fiber Coupler", *Appl. Optics,* 12, 391, 1974.
Dillard et al, "Fiber and Integrated Optics Techniques . . . ", *Natl. TeleComun. Conf. Record,* VIII, pp. 37.5-1 to 37.5-5, Dec. 1976.

(List continued on next page.)

*Primary Examiner*—John D. Lee
*Attorney, Agent, or Firm*—Harvey Fendelman; Thomas Glenn Keough

[57] ABSTRACT

An aligned and spaced-apart end-on optical coupling is provided between the end of a single mode optical fiber and the emitting aperture of an edge-emitting diode mounted on a heat sink secured to a base. A V-shaped grooved semiconductor chip is mounted on the base a distance from the edge-emitting diode and a UV curable optical cement is applied in the V-shaped groove and on a lateral surface of the optical fiber. If desired, a coarse alignment can be effected at this stage to position the fiber. The optical fiber is placed in the V-shaped groove to present an overhanging portion so that the UV curable optical cement contacts an end support secured to the edge-emitting diode. The optical fiber is displaced to a position of a desired optical alignment and predetermined separation between end of the optical fiber and the emitting aperture by a hypodermic needle-sized vacuum chuck coupled to the overhanging portion of the optical fiber. A micromanipulator displaces the chuck to effect the desired optical alignment and separation and UV energy is radiated on the UV curable optical cement in the V-shaped groove and on the lateral surface of the optical fiber where it comes in contact with the bearing surface of the end support to secure the fiber in its aligned and spaced-apart relationship.

12 Claims, 3 Drawing Sheets

OTHER PUBLICATIONS

Ramer, "Single Mode Fiber-to-Channel Waveguide Coupling", *J. Opt. Commun.*, 2, 122, 1981.
Alferness et al, "Efficient Single-Mode Fiber to . . . ", *IEEE J. Quantum Electron*, QE-18 1807, 1982.
Papuchon et al, "High Coupling Efficiencies Between . . . ", Paper FB3-1, *Topical Mtg. on Int. & Guided-Wave Optics*, Jan. 6–8, 1982.
Bulmer et al, "High Efficiency Flip-Chip Coupling Between . . . ", *Appl. Phys. Lett.*, 37, 351, 1980.
Noda et al, "Single-Mode Optical-Waveguide Fiber Coupler", *Appl. Optics*, 17, 2092, 1978.
Milton et al, "Multiple Fiber End Fire Coupling With . . . ", *Appl. Phys. Lett.*, 33, 603, 1978.
Ramer et al, "Experimental Integrated Optic Circuit . . . ", *IEEE J. Quantum Electron*, QE-17, 970, 1981.
Kondo et al, "Integrated Optical Switch Matrix For . . . ", *IEEE J. Quantum Electron.*, QE-18, 1759, 1982.
Gordon et al, "Fiber-Break Testing by Interferometry . . . ", *Appl. Optics*, 16, 818, 1977.
Schumacher, "Defect-Free, Edge Polishing of Lithium Niobate . . . ", *NOSC TR*-480, Nov. 1980.
Furch et al, "Fast High-Quality Edge Polishing of $LiNbO_3$", *J. Opt. Commun.*, 4, 47, 1983.
"Norland Products Adhesive 61", Norland Products, Inc., Box 145, North Brunswick, N.J. 08902.
Wimperis et al, "Optical Cements for Interferometric Applications", *Appl. Optics*, 23, 1145, 1984.
Khoe et al, "Progress in Monomode Optical-Fiber . . . ", J. Lightwave Techn., vol. LT-2, No. 3, Jun. 1984, pp. 217–227.
"Passive Components for Optical Coupling . . . ", Semiconductor Laser Transmitters, *Optoelectronic Techn. and Lightwave Commun. Systems*, Van Nostrand Reinhold (NY), 1990.
"Lightwave Transmitters", Ed. by S. Miller et al, *Optical Fiber Telecommunications* II, Academic Press, 1990.

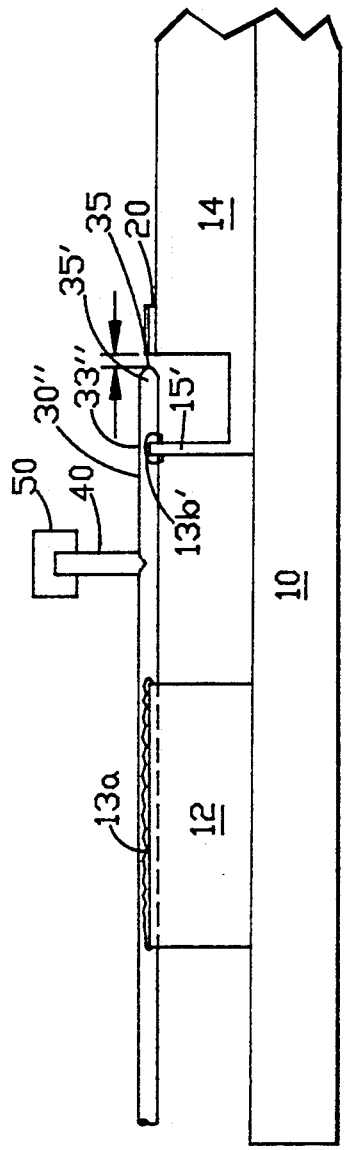
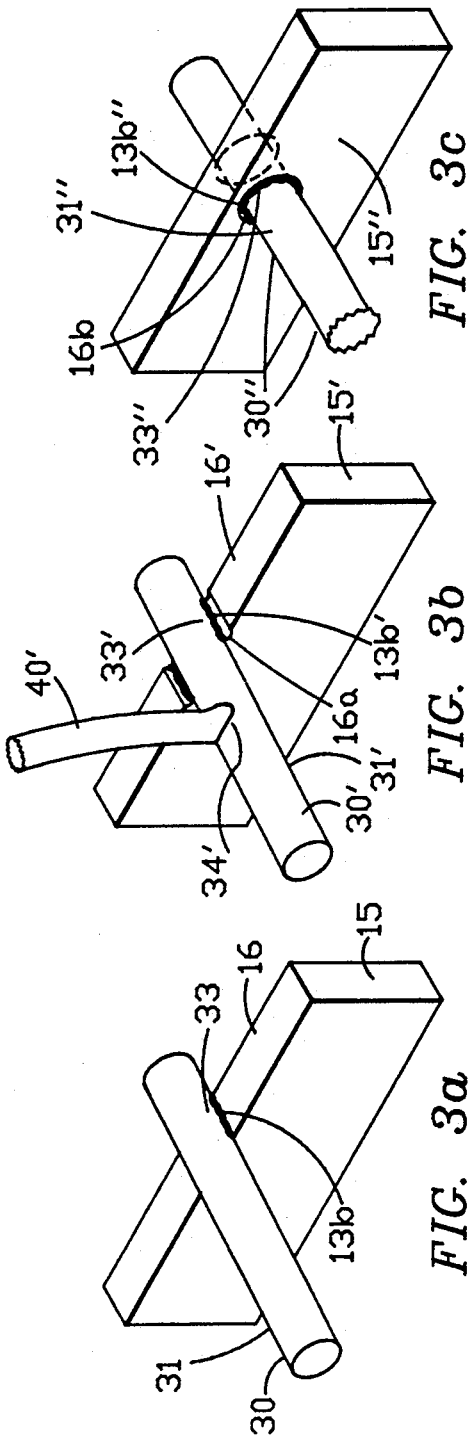

EDGE-EMITTING DIODE-TO-OPTICAL FIBER COUPLING TECHNIQUE

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This is a continuation in part of a co-pending U.S. Pat. application Ser. No. 07/318,989 filed Mar. 3, 1989 entitled "Optical Fiber-To-Channel Waveguide Coupler" by Donald J. Albares et al., now U.S. Pat. No. 4,930,854.

BACKGROUND OF THE INVENTION

This inventive concept at least partially has a basis in the background for the cross-referenced co-pending application. In addition an article by G. Iok-Ejan Khoe et al. entitled "Progress in Monomode Optical-Fiber Interconnection Devices" *Journal of Light Wave Technology* Volume LT-2, 3, June 1984 discusses efficiencies of couplings for a number of coupling devices for monomode fiber systems. The laser diode-to-fiber coupling, packaging connectors and splicing discussed herein along with the use of certain lenses cover a variety of coupling techniques that are evolving toward improving coupling efficiencies and the need for better concepts in this regard. The text entitled *Optoelectronic Technology and Lightwave Communications Systems*, edited by Chinlon Lin, Van Nostrand Reinhold, N.Y. 1990 discusses, on pages 182 through 186, laser to fiber coupling with a variety of techniques. The packaging referred to in paragraph 7.3.2 in association with FIG. 7.9 (c) alludes to a fiber end alignment inside of a package and states that the actual position must be adjusted before the hermetic fiber seal is made. It calls for adjusting in two lateral directions with the aid of additional support inside of the package and that a sequence of adjustments depends on a particular construction of the encapsulation. This article certainly brings attention to the need for such capability yet is not clear in how this capability is performed. The publication *Optical Fiber Telecommunications II* edited by Stuart E. Miller and Ivan P. Kaminow, Academic Press, Inc., Boston, Mass., 1990, discusses a number of coupling stability and packaging techniques in the chapter entitled "Lightwave Transmitters", pages 747 through 752. The essentially butt-joined connectors disclosed herein disclose the use of spot welds to secure the fiber alignment; however, it is not clear how the alignments are preserved with the stresses and strains created during the fabrication procedure.

Thus, a continuing need exists in the state of the art for a method for making an optical fiber-to-edge-emitting-diode coupling that accurately establishes and maintains a secured, predetermined separation between the end of the single mode optical fiber and the emitting aperture of the light-emitting diode and a precise transverse alignment therewith which is cemented in place without the creation of undue misaligning strains.

SUMMARY OF THE INVENTION

The present invention is directed to providing a method and apparatus for fabricating a spaced-apart and aligned end-on optical coupling between the end of a single mode optical fiber and an edge-emitting diode (EED) mounted on a heat sink secured to a base. A semiconductor chip provided with a V-shaped groove is mounted on the base a distance from the EED in a condition of coarse alignment. A UV curable optical cement is applied in the V-shaped groove and on a lateral side surface of the optical fiber. The optical fiber is placed in the V-shaped groove to present an overhanging section of the optical fiber that has the UV curable optical cement on the lateral side surface of the optical fiber so that the UV curable optical cement contacts a support secured to the EED. The optical fiber is displaced to a position of optical alignment between the core of the optical fiber and the emitting aperture of the EED by a hypodermic needle-sized vacuum chuck coupled to the overhanging section of the optical fiber. The hypodermic needle-sized vacuum chuck also displaces the optical fiber to a desired predetermined separation of between 5 and 50 microns or other desired separation between the end of the optical fiber and the emitting aperture of the EED. When the displacement of the optical fiber by the micromanipulator results in the desired optical alignment and separation, UV energy is radiated on the UV curable optical cement in the V-shaped groove and on the lateral side surface of the optical fiber where it comes in contact with a bearing surface of the end support to secure the fiber in its aligned and spaced-apart relationship.

An object of the invention is to provide for a permanent optical fiber alignment and interconnection to receive the emitted energy from an EED.

Another object is to provide for a secure interconnection between an optical fiber and an EED that provides a rugged aligned support for the optical fiber.

Another object of the invention is to provide a method for end-on coupling of optical fibers to an EED with a selective or enhanced optical coupling efficiency.

Still another object of the invention is to provide for an alignment technique for end-on coupling of an optical fiber to receive the energy emitted from an emitting aperture of an EED that is performed in separate steps to give a coarse and fine adjustment to maximize the strength and optical coupling and to minimize the thermal stresses otherwise associated with the curing of some means of securing.

Another object of the invention is to provide an assembly technique for optically coupling at least one optical fiber to receive the emitted energy from the emitting aperture of an EED that spaces the fiber end from the aperture to avoid the possibility of interfering with the diode facet.

Another object is to provide an alignment technique and method for securing an optical fiber with respect to an EED that positions and secures the fiber in a spaced apart relationship from the diode facet in a precisely aligned relationship to assure a ruggidized coupling thereof.

Still another object of the invention is to provide an optical interconnection technique between an optical fiber and an EED that does not disturb or roughen up or create other causes of reflections going back into the diode with a secure efficient coupling thereof.

Still another object is to provide for an optical coupling technique which accommodates a lens capability on the end of an optical fiber by spacing the fiber from the diode emitting aperture and locating the lens capability in a spaced apart and precisely aligned position.

Still another object of the invention is to provide a technique for aligning the end of an optical fiber in a predetermined spaced apart separation of between 5 and 50 microns or other desired separation from the emitting aperture of an EED facet.

A further object is to provide a technique for aligning the end of an optical fiber in a predetermined spaced apart separation of between 5 and 50 microns or other desired separation from the emitting aperture on an EED facet in which the alignment is within 1×2 microns to accommodate a typical 1 or 2×½ micron emitting aperture of an EED.

These and other objects of the invention will become more readily apparent from the ensuing specification and claims when taken in conjunction with the drawings.

BRIEF DESCRIPTION OF THE DRAWINGS

FIG. 2 is a side view of the invention to draw a reader's attention to the separation between the fiber end and the emitting aperture of the EED.

FIGS. 3 (a), 3 (b), 3 (c) and 3 (d) show typical end supports.

DESCRIPTION OF THE PREFERRED EMBODIMENT

Figure 1:
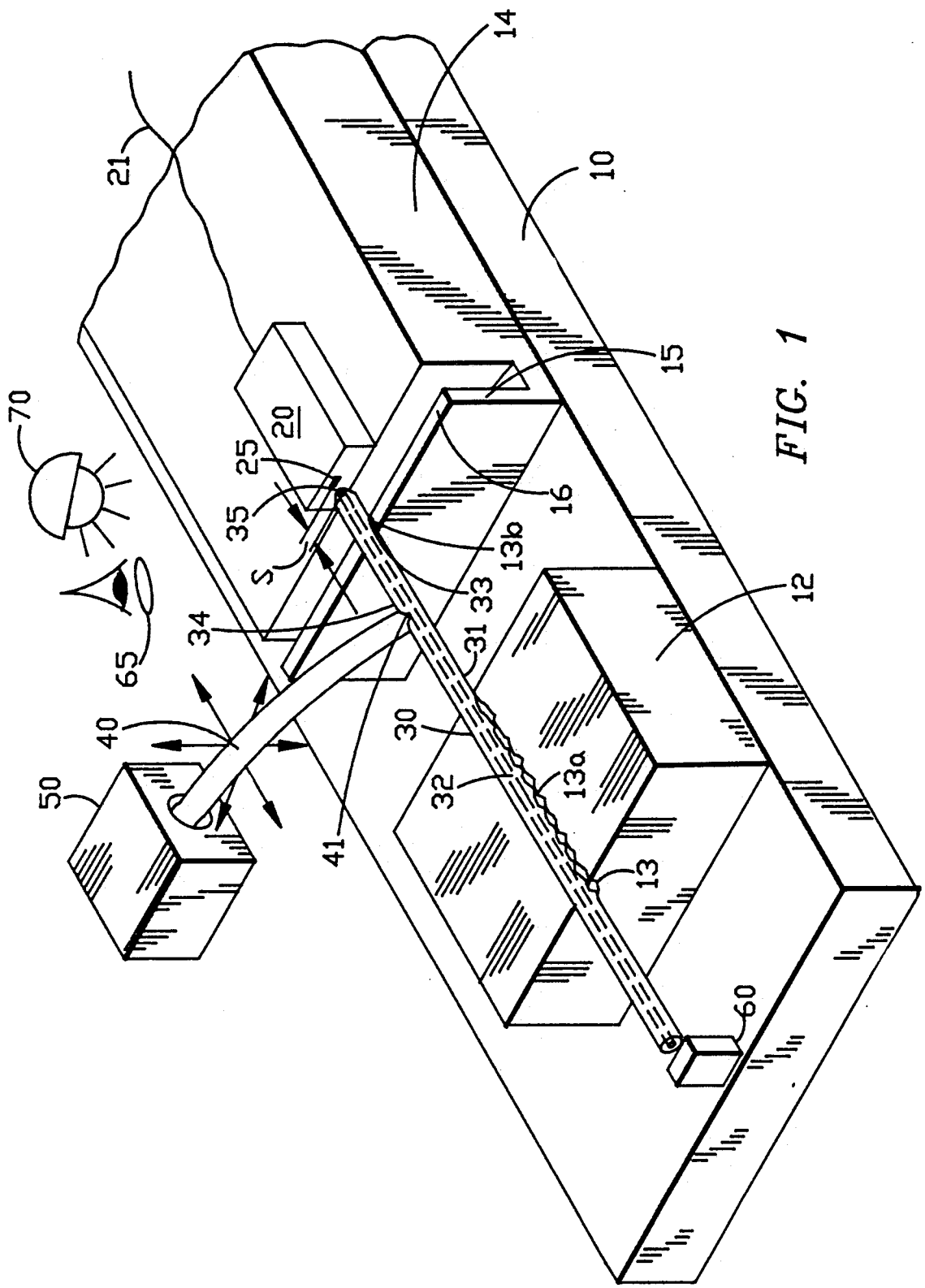
FIG. 1 depicts an isometric portrayal of the salient features of this concept.

Referring now to FIG. 1 of the drawing a substrate, a metal, ceramic or glass carrier 10, for example, provides a rigid mounting surface for a silicon chip 12. The chip is shaped with a V-groove 13 which is appropriately fabricated by techniques well-known in the art. The chip is located on carrier 10 in a spaced apart relationship of about 10 millimeters from a laser mount-heat sink 14 that is fashioned from an appropriate material for drawing away and transmitting heat. The heat sink has an integral end or edge support 15 of only a few millimeters thick which is provided with a bearing surface 16 which is substantially at the same level or slightly higher than the upper surface of the heat sink.

An edge emitting diode 20 is mounted on the upper surface near the edge of heat sink 14 so that its emitting aperture 25 faces away from the heat sink over a bearing surface 16 of an end o edge support 15. The term edge emitting diode is intended to include laser diodes, edge emitting light emitting diodes and superluminescent diodes throughout this specification. The emitting aperture has a dimension of about 1 to 2 microns wide and about ½ micron high. Energy emitted through this aperture diverges in a substantially cone-shaped projection that radiates in a perpendicular direction from the EED facet surface of the emitting aperture. The EED has a conductor 21 extending to remote processing circuitry, not shown.

An optical fiber 30 is mounted in V-shaped groove 13 of block 12 in a manner to be described herein below to effect a coarse alignment of its core to the diverging cone of energy emitted from EED 20. The fiber, a single mode fiber although multimode could be used in some applications, has an overhanging section 31 which is about 10 millimeters long and roughly, is equal to the distance between chip 12 and heat sink 14. It is essential also to point out that whether for single fiber or multiple fiber alignments the separation S between the end 35 of core 32 of optical fiber 30 and the emitting aperture 25 of the EED is provided for to assure an optimum energy transfer without the possibility of damaging or disturbing the diode facet.

At this point it should be emphasized that although this description concerns but a single optical fiber in a single V-groove to be aligned with a single EED, a plurality of fibers and EEDs could be located in appropriately disposed V-grooves and locations on the heat sink to assure precise alignment therewith in coarse and fine steps as explained below.

A coarse alignment between core 32 of optical fiber 30 and emitting aperture 25 of EED 20 precedes a fine alignment of the core to the emitting aperture. The coarse alignment is determined by the alignment of the V-groove 13 with emitting aperture 25 of the EED and is roughly within 10 microns of being perfectly aligned. The vertical coarse alignment is determined, of course, by the depth of the groove 13, the thickness of chip 12 and sink 14 and the thickness of the cement or bonding agent holding chip 12 onto common substrate or carrier 10. Transverse or angular coarse alignment of V-groove 13 with respect to emitting aperture 25 of EED 20 is accomplished by bringing the chip into registration with a microscope filar or by reference to chip edges, other grooves or lithographic markers, all of which are well known coarse alignment techniques to those skilled in this particular art. Optical fiber 30 may be secured to chip 12 in V-groove 13 by a UV curable optical cement 13a to the chip 12 to hold the fiber in its relatively coarse alignment with emitting aperture 25 of EED 20 on heat sink 14 (heat sink 14 has been suitably affixed by bonding or other suitable means to base 10 prior to the coarse alignment of the fiber).

Two sequences have been developed for the precise aligning of end 35 within a one-by-two micron area in a predetermined 5 to 50 micron spacing or other desired separation S from the diode facet of emitting aperture 25 of EED 20. One sequence calls for the placing of fiber 30 in V-groove 13 and applying a small amount of UV curable cement 13b on the outside surface (lateral side) 33 of optical fiber 30. The small amount of UV curable optical cement 13b on lateral surface 33 also comes in contact with bearing surface 16 of end support 15, and a bonding engagement between the fiber and end support can be made at this time.

A vacuum chuck configured in the shape of a vacuum needle 40 is provided with an appropriately configured grooved end 41 to fit about a portion 34 of extension 31 that is near outer surface 33 where UV cement 13b has been applied. The vacuum needle of the vacuum chuck is connected to a three-axis micromanipulator 50 that has the capability to be responsibly actuated to position the vacuum needle of the vacuum chuck to appropriately displace end 35 of optical fiber 30 with respect to a desired alignment and separation with respect to the emitting aperture 25 of EED 20. An observer monitoring a detector 60 and watching through a microscope 65 or appropriate instrumentation will note the gap between end 35 and aperture 25 will be able to determine when the approximately 5 to 50 -micron or other separation or whatever else focal length or parameter of interest is reached. Detector 60 provides an indication when the emitted light energy is at a maximum to verify the separation between end 35 and aperture 25 is at a proper focal length or light gathering distance The detector also indicates determinable values when the precise alignment between end 35 and aperture 25 is within one or two microns by one micron has been achieved with respect to the axis or center of the aperture 25 of EED 20.

When the condition is reached that gives a maximum optical transmission or a desired degree of transmission as required by a particular need, an appropriate step is taken to secure the fiber in place. A UV light source 70 is actuated and UV light radiates upon optical cement 13b to cure it where it is in contact with the outer surface 33 of fiber 30 and on that portion of bearing surface 16 which is in contact with UV curable optical cement 13b. When the UV illumination is applied, the cement holds the fiber in this precisely aligned relationship and separation with respect to the surface of emitting aperture 25. This precisely aligned relationship has been determined by appropriate actuation of three-axis manipulator 50 that displaces the fiber longitudinally and laterally in accordance with appropriate displacements by vacuum needle 40. Monitoring the light intensity at detector 60 and visually observing the separation through microscope 65 (or other suitable viewing arrangement) assures that this precisely aligned and separated relationship exists.

After UV curable cement 13b has cured, UV light source 70 is once again actuated to shine upon the adhesive 13a in V-shaped groove 13 to cure (harden) it. This securely, mechanically anchors fiber 25 with respect to chip 12 as well as securing the aligned relationship by the UV cemented interconnection between the fiber 33 and surface 16 of end support 15.

The other sequence for bonding the fiber calls for applying a coating or layer of UV curable optical cement 13a in the groove 13 and placing fiber 30 in it. More of the UV curable adhesive 13a may be applied if desired to assure the securing of the fiber in this procedure. UV source 70 is turned on to flood UV energy onto cement 13a and thereby secure the fiber in its place of coarse alignment with respect to emitting aperture 25.

With fiber 30 being secured onto chip 12 adhesive 13b is applied to outer surface 33 of overhanging section 31 of fiber 30. This application is sufficient to fill any gap that may exist between the lateral surface and a portion of bearing surface 16 of end support 15. The fine alignment procedure outlined above is effected by micromanipulator 50 and vacuum needle 40 of the vacuum chuck after the fiber has been engaged by slot 41 of chuck 40. When the desired alignment and separation of end 35 from emitting aperture 25 is established, UV radiation from UV source 70 cures and hardens adhesive 13b. The alignment and separation are assured by observation through microscope 65 and by monitoring the readings of detector 60.

The second sequence has the flexibility in that fiber 30 can be cemented onto chip 12 and remain in place for an arbitrary curing period, after which time the fine aligning and cementing can occur. Care must be exercised in this step, however, to assure that the spacing from the end 33 of overhanging section 31 of fiber 30 and the emitting aperture 25 is assured before the hardening of the UV cement 13a. The fine tuning step for lateral alignment of the fiber via the micromanipulator and needle chuck can be performed separately and may allow an operator to concentrate on this aspect alone to help assure quality control, for example. In any case, the outside surface 33 and not the end of the fiber that has the UV curable adhesive applied thereto for the final positioning of the fiber.

Thus, by separating V groove support-chip 12 and end support 16 by a distance of 50 to 100 fiber diameters (about 10 millimeters), stresses otherwise attendant a final alignment and cement curing in the V groove are considerably reduced at the fiber-EED interface. The small amount of UV curable cement 13b that comes in contact with outer surface 33 of overhanging portion 31 of optical fiber 30 and a portion of bearing surface 16 of end support 15 minimizes curing stresses at that point. The small amount of cement also furnishes sufficient strength to maintain the fiber in its fine-positioned place.

The small needle vacuum chuck allows a fiber to be manipulated to a closely-spaced array when multiple grooves and a plurality of EEDs are to be coupled and allows this number of fibers to be cemented and cured in place. Withdrawal of the chuck is preceded by turning off the vacuum and will not disturb the cemented coupling. The manipulator and vacuum chuck, with the hypodermic needle sized dimensions, are established designs freely available in the art. Because the needle sized chuck is used, approximately a 325-micron fiber center-to-center spacing could be used for optical coupling of fibers in appropriately located V-grooves. This can accommodate a considerable number of fibers in precisely aligned tight confines such as those experienced in optical integrated circuit configurations.

The V-grooves were etched in a established procedure well known in the art. The optical cement used was one of many commercially available adhesives which cure when exposed to UV light and have good adhesion, low shrinkage, flexibility with an index of refraction approximately equal to 1.5 and are usable in interferometric applications.

The UV lamp radiates about 1 mW per centimeter and effects the curing of the adhesive after about two minutes. Complete curing is achieved after about 15 minutes with a selected fiber. The selected fibers can be any one of a variety which are well known in the art.

Photodetector 60 and the optical viewing device such as a microscope 65 are well known and well established in the art to provide an observer and operator with sufficient information to appropriately actuate micromanipulator 50 to suitably displaced needle sized chuck 40 and position the fiber.

It is important to emphasize that the separation S between the end of the fiber and the emitting aperture be maintained since nothing should contact the diode facet. The mirror surface of the diode should not be disturbed, or otherwise roughened up, or have other causes of reflection going back into the diode. When such disturbance or roughening occurs, the emitted light is likely to be unduly scattered. The present invention is particularly designed to assure that the separation between the fiber end and the EED occurs.

End 35 of an optical fiber 30 may be provided with an integral lens 35' that is intended to increase the coupling efficiency between the optical fiber and the EED. This can provide for an up to 50 micron or more separation that should be properly spaced to maximize coupling. The embodiment schematically set forth in FIG. 2 shows an integral lens 35' on end 35 of optical fiber 30 with the aforedescribed elements. This type of a lens configuration is routinely created by techniques well established in the art. Since most of the coarse alignment with the precision V-grooves has been accomplished in accordance with accepted techniques, the plus or minus ten micron deviation expected in a coarse alignment can be accommodated by the adhesive 13b when it is placed between the outer surface 33 on the side of the fiber and the portion of the bearing surface 16a of edge support 15'(the edge support configuration of FIG. 3b (described below) has been selected for demonstrative purposes with respect to the showing of lens 35'). This allows the fiber to be brought within an alignment with the appropriate one to two micron by one micron area for an edge emitting diode. Typically, such an EED has a one or two micron wide by one micron thick emitting aperture.

Referring now to FIGS. 3a, 3b, 3c and 3d, four configurations for an end support are shown. FIG. 3a depicts edge support 15 with the flat bearing surface 16 as shown in FIGS. 1 and 2. The UV cement 13b on outer surface 33 also contacts a small portion of bearing surface 16. The small amount of the UV curable adhesive can easily span a separation of greater than 10 microns so that the fine positioning step can be performed and UV illumination will hold the fiber and EED in alignment and separation.

A modified support 15' is shown in FIG. 3b. Support 15' has a bearing surface 16' additionally provided with a groove 16a in which optical cement 13b' is disposed. Portion 33' of overhanging portion 31' of optical fiber 30' comes in contact with the cement and micromanipulator 40' engages part 34' of optical fiber 30' to appropriately position it so that exposure to UV light holds the fiber in place.

End or edge support 15" of FIG. 3c is another modification in which a hole 16b is bored through the end support. Overhanging portion 31" of fiber 30" is inserted through the hole in a loose fit and a portion of the UV curable cement 13b" contacts the outer surface 33" of the fiber and the inner surface of the hole. UV light cures the fiber in place after the needle vacuum chuck has been appropriately displaced to effect the proper alignment and spacing. In the embodiment of 3c, the end support might be transparent to allow the UV energy to penetrate.

The end or edge support in each of these embodiments should be thinned to about one millimeter or less to minimize the amount of cement and potential curing stresses. The loose fitting circular hole and support of FIG. 3c appears to be a preferred configuration since the symmetry of applied cement around the fiber would minimize any curing stresses. Transparency in this case is desirable.

While the support has been shown to be an integral part of the base, the embodiment of FIG. 3d shows that it is within the purview of this inventive concept to have a small post 15' provided with a bearing surface 16' on which lateral surface 33' of optical fiber 30' is supported and affixed thereto by UV curable optical cement 13b. The assembly procedure may call for first securing optical fiber 30' to the post via a UV curable adhesive 13b and then maneuvering the fiber and post till a desired alignment separation is perceived. This will allow an assembler to appropriately displace the post to achieve the desired alignment (after the separation has been provided for) and then the post could have UV cement 13b' applied on or along its bottom at substrate 10 and cured by UV illumination.

Optionally, the fiber end section could be fastened to an end support by coating the fiber with a metal via an electronic deposition process or other metalization process, and then soldering the fiber down to the support. A disadvantage of this approach is that the support would have to be heated, which may lead to stresses upon cooling.

Figure 4:
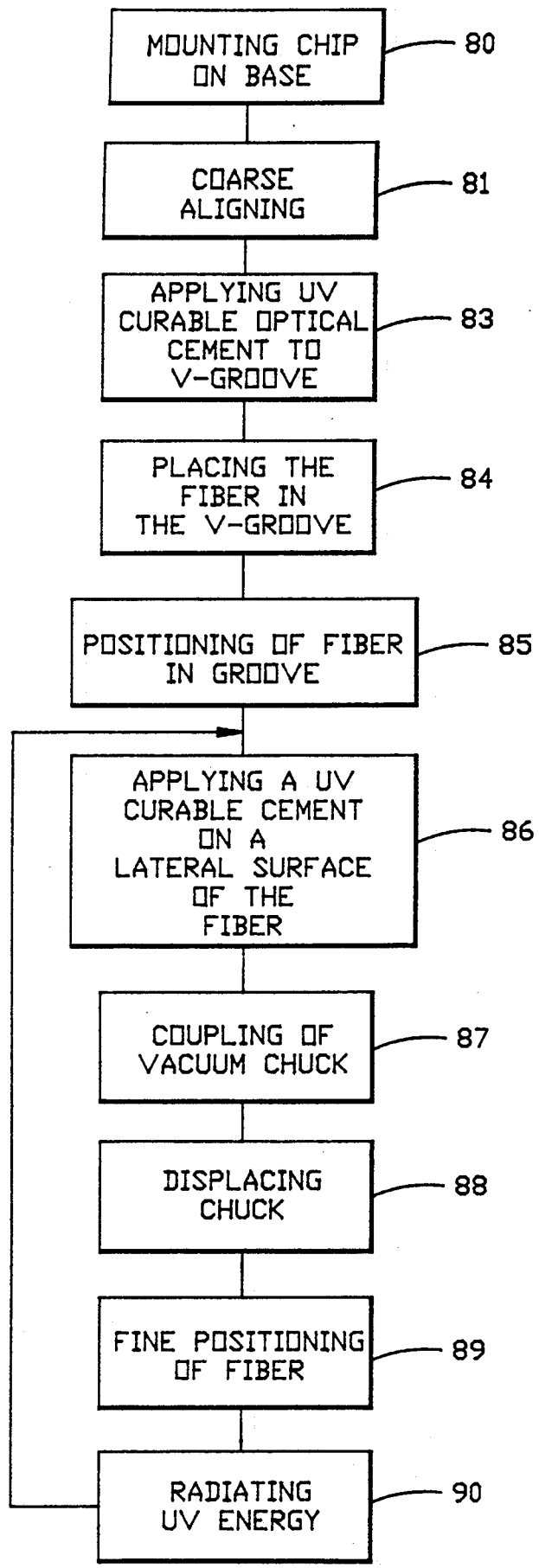
FIG. 4 is a block diagram representation of this inventive concept.

Looking now to FIG. 4 of the drawings, the method for fabricating an aligned end-on coupling in a properly spaced relationship between a single mode optical fiber and the emitting aperture of an EED, is set forth in graphic format to enable a more thorough understanding of this inventive concept. The aligned end-on coupling of the optical fiber is made to an EED in a spaced relationship from the emitting aperture. Mounting 80 a semiconductor chip o the base that is provided with at least one V-shaped groove allows a subsequent coarse aligning 81 with the emitting aperture of the EED. Applying 83 a UV curable optical cement in the V-shaped groove and on an exposed side surface of the optical fiber precedes the placing 84 of the optical fiber into the V-shaped grooved and the positioning 85 of an overhanging section including the end of the optical fiber adjacent to the emitting aperture of the EED in a space relationship. The end of the optical fiber thusly is located in a desired coarse optical alignment with the emitting aperture at the discrete space relationship from the emitting aperture. After the end of the optical fiber has been appropriately located, radiating 90 UV energy into the UV curable adhesive secures the optical fiber in the V-shaped groove. Applying 86 a lateral outside surface of the optical fiber with a layer of UV curable optical cement to a thickness of about 10 microns. Coupling 87 a hypodermic needle-sized vacuum chuck that is displaced by a micromanipulator assures the selective displacing 88 of the chuck and the fiber ca effect the desired optical alignment and space relationship of the optical fiber with respect to the emitting aperture of the EED to arrive at the precise fine aligned positioning 89 of the end of the optical fiber with respect to the emitting aperture of the EED. Radiating 90 UV energy onto this UV cement assures that a precisely aligned and spaced optical coupling can be made. Optionally, there can be an applying 86 to both the V-shaped groove and lateral surface of the optical fiber with a UV curable optical cement and simultaneously radiating 90 with UV energy to secure both portions of the fiber at substantially the same time. Coarse, vertical, lateral and angular aligning 81 between the V-shaped groove and the optical waveguide precedes and aides in the later precise fine positioning 89 of the fiber end with respect to the emitting aperture of the EED at the proper spatial disposition. Since the vacuum chuck is approximately hypodermic needle sized, a plurality of adjacent V-shaped grooves and appropriately similarly disposed EEDs can be optically interconnected with the same or desired alignments and separations between the fiber ends and the emitting apertures of the EEDs within the small dimensions required for suitable coupling thereof.

While this specification thus far has concerned itself with the use of UV curable adhesives in the affixing of the fiber in the coarse alignment procedure, high temperature solders or spot welds could be used in the coarse alignment and fixation procedure. Obviously ,if these techniques were to be relied upon metal tubes functioning as ferrules and appropriate compatible base materials would be required to properly take advantage of these expedients.

This same technique could also apply to the alignment of a fiber with a detector where there has to be a separation as well as an alignment. However, the alignment does not have to be as Critical since the aperture of the detector is much larger.

The aforedescribed technique lends itself to automation and a host of computer-controlled and servo-controlled assembly procedures. Appropriate data gathering and responsive control can be drawn upon to expedite mass assembly of production lots by advantageously applying the teachings of this inventive concept.

Obviously, many other modifications and variations of the present invention are possible in light of the above teachings. It is therefore to be understood that within the scope of the claims the invention may be practiced otherwise than as specifically described.

What is claimed is:

1. A method of end-on optically coupling an optical fiber to the emitting aperture of an edge-emitting diode (EED) mounted on a base comprising:
   mounting a semiconductor chip provided with a V-shaped groove on said base in a spaced-apart relationship with respect to said EED;
   applying a UV curable optical cement in said V-shaped groove and on an exposed lateral surface of an overhanging portion of said optical fiber;
   placing said optical fiber in said V-shaped groove to locate said overhanging portion including said lateral surface having the UV curable optical cement applied thereto on an end support rigidly affixed to said EED;
   positioning said optical fiber to a position in which the end of said optical fiber has a position of desired optical alignment with said emitting aperture of said EED and a desired separation from said emitting aperture of said EED; and
   radiating UV energy on said UV curable optical cement to cure it and to secure said optical fiber in said V-shaped groove and on said end support via said lateral surface on said overhanging portion o said optical fiber in said position of said desired optical alignment of said end of said optical fiber with said emitting aperture of said EED and said desired separation of said end of said optical fiber from said emitting aperture of said EED.

2. A method according to claim 1 in which the step of positioning includes the coupling of said overhanging portion to a hypodermic-needle sized vacuum chuck and the selective displacing of said vacuum chuck and said overhanging portion in a three axis displacement to assure said position of said desired optical alignment of said end of said optical fiber with said emitting aperture of said EED and said desired separation of said end of said optical fiber from said emitting aperture of said EED.

3. A method according to claim 2 in which the step of applying said UV curable optical cement on said lateral surface of said overhanging portion of said optical fiber is the coating of said UV curable optical cement to a thickness of about 10 microns which is sufficient to assure the contact of a bearing surface of said end support.

4. A method according to claim 1, 2, or 3 in which the step of mounting includes a coarse aligning and cementing of said semiconductor chip on said base to provide a coarse vertical, lateral and angular alignment and a predetermined spatial disposition between said end of said optical fiber and said emitting aperture of said edge-emitting diode.

5. A method according to claim 1, 2 or 3 in which the step of radiating UV energy is first on said UV curable optical cement in said V-shaped groove to allow for the curing thereof to effect a coarse alignment and separation of said end of said optical fiber with respect to said emitting aperture after the step of mounting and at a later time the step of radiating UV energy is on said UV curable optical cement disposed on said lateral surface of said overhanging portion of said optical fiber to allow for the curing thereof to effect a fine alignment after the step of positioning.

6. A method according to claim 2 or 3 in which a plurality of V-shaped grooves is provided in said semiconductor chip coarsely aligned with a plurality of similarly disposed emitting apertures of edge-emitting diodes, the lateral separation of said grooves and said plurality of emitting apertures being sufficient to accommodate the dimensions of said hypodermic-needle sized vacuum chuck.

7. A method of end-on optically coupling an optical fiber to the aperture of a detector mounted on a base comprising:
   mounting a semiconductor chip provided with a V-shaped groove on said base in a spaced-apart relationship with respect to said detector;
   applying a UV curable optical cement in said V-shaped groove and on an exposed lateral surface of an overhanging portion of said optical fiber;
   placing said optical fiber in said V-shaped groove to locate said overhanging portion including said lateral surface having the UV curable optical cement applied thereto on an end support rigidly affixed to said detector;
   positioning said optical fiber to a position in which the end of said optical fiber has a position of desired optical alignment with said aperture of said detector and a desired separation from said aperture of said detector; and
   radiating UV energy on said UV curable optical cement to cure it and to secure said optical fiber in said V-shaped groove and on said end support via said lateral surface on said overhanging portion of said optical fiber in said position of said desired optical alignment of said end of said optical fiber with said aperture of said detector and said desired separation of said end of said optical fiber from said aperture of said detector.

8. A method according to claim 7 in which the step of positioning includes the coupling of said overhanging portion to a hypodermic-needle sized vacuum chuck and the selective displacing of said vacuum chuck and said overhanging portion in a three axis displacement to assure said position of said desired optical alignment of said end of said optical fiber with said aperture of said detector and said desired separation of said end of said optical fiber from said aperture of said detector.

9. A method according to claim 8 in which the step of applying said UV curable optical cement on said lateral surface of said overhanging portion of said optical fiber is the coating of said UV curable optical cement to a thickness of about 10 microns which is sufficient to assure the contact of a bearing surface of said end support.

10. A method according to claim 7, 8 or 9 in which the step of mounting includes a coarse aligning and cementing of said semiconductor chip on said base to provide a coarse vertical, lateral and angular alignment and a predetermined spatial disposition between said end of said optical fiber and said aperture of said detector.

11. A method according to claim 7, 8 or 9 in which the step of radiating UV energy is first on said UV curable optical cement in said V-shaped groove to allow for the curing thereof to effect a coarse alignment and separation of said end of said optical fiber with respect to said aperture after the step of mounting and at a later time the step of radiating UV energy is on said UV curable optical cement disposed on said lateral surface of said overhanging portion of said optical fiber to allow for the curing thereof to effect a fine alignment after the step of positioning.

12. A method according to claim 8 or 9 in which a plurality of V-shaped grooves is provided in said semiconductor chip coarsely aligned with a plurality of similarly disposed apertures of detectors, the lateral separation of said grooves and said plurality of apertures being sufficient to accommodate the dimensions of said hypodermic-needle sized vacuum chuck.

* * * * *